United States Patent [19]

Höroldt et al.

[11] Patent Number: 4,923,485
[45] Date of Patent: May 8, 1990

[54] PROCESS FOR SEPARATING ORGANIC CONSTITUENTS FROM WASTE GASES OF THE PRODUCTION OF AROMATIC INTERMEDIATES

[75] Inventors: Ernst Höroldt, Kelkheim; Richard Grimm, Königstein; Siegbert Rittner, Mörfelden-Walldorf; Herbert Kuckertz, Kelkheim; Wilfried Billmann, Frankfurt am Main, all of Fed. Rep. of Germany

[73] Assignee: Hoechst Aktiengesellschaft, Frankfurt Am Main, Fed. Rep. of Germany

[21] Appl. No.: 291,515

[22] Filed: Dec. 29, 1988

[30] Foreign Application Priority Data

Nov. 9, 1987 [DE] Fed. Rep. of Germany ....... 3837987
Dec. 31, 1987 [DE] Fed. Rep. of Germany ....... 3744594

[51] Int. Cl.$^5$ ............................................. B01D 19/00
[52] U.S. Cl. .......................................... 55/55; 55/71; 570/211
[58] Field of Search .......................... 55/71, 73, 84, 55; 570/211; 568/937, 938

[56] References Cited

U.S. PATENT DOCUMENTS

| 416,913 | 5/1943 | Rath et al. ............................... 55/71 |
| 3,148,041 | 9/1964 | Dehn et al. .............................. 55/71 |
| 3,689,582 | 9/1972 | Wakiyama et al. ...................... 55/71 |
| 4,028,072 | 6/1977 | Braun et al. ........................... 55/195 |
| 4,029,552 | 6/1977 | Fozzard .................................. 55/84 |
| 4,043,769 | 8/1977 | Nishimo et al. ........................ 55/25 |
| 4,102,983 | 7/1978 | Yamase et al. .......................... 55/84 |

FOREIGN PATENT DOCUMENTS

| 249193 | 9/1987 | German Democratic Rep. ..... 55/71 |
| 424874 | 10/1974 | U.S.S.R. .................................. 55/84 |
| 2061126 | 5/1981 | United Kingdom . |

Primary Examiner—Bernard Nozick

[57] ABSTRACT

A process for the separation of undesired organic ingredients from waste gases which are formed in the preparation of aromatic intermediates which comprises washing the waste gases with a washing liquid comprising (a) paraffinic hydrocarbons having from 10 to 20 carbons atoms or (b) diisopropylnaphthalene or a mixture of isomers thereof having the sum formula $C_{16}H_{20}$, an average molecular weight in the range of from 210 to 215, a boiling range in the range of from 290 to 300° C. (according to DIN 51 761) and a flash point above 130° C. (according to DIN 51 758).

at a temperature in the range of from 0 to 50° C. to remove the said undesired organic ingredients.

22 Claims, No Drawings

PROCESS FOR SEPARATING ORGANIC CONSTITUENTS FROM WASTE GASES OF THE PRODUCTION OF AROMATIC INTERMEDIATES

The invention relates to a process for separating organic constituents from waste gases which arise in the production of aromatic intermediates by means of various reductions such as nuclear chlorinations and brominations, side-chain chlorinations and brominations, nitrations, reductions, exchange reactions, oxidations, carboxylations, alkylations, condensations, rearrangements and the like.

In these processes, streams of waste gases arise, the composition of which depends on the starting materials, the desired products and the selected procedure, for example discontinuous or continuous operation. The impurities in the waste gas thus greatly differ in their physical and chemical properties from one another and within wide limits. They are starting materials, reaction products, by-products and decomposition products, and are, for example, methylaromatics such as toluene, xylenes, p-tert-butyltoluene, chloro-, bromo- and fluorotoluenes, nitrobenzene, chloronitrobenzenes, nitrotoluenes, dinitrobenzenes, chloronitrotoluenes, nitroxylenes, chloronitroxylenes, nitroanisoles, nitrophenetoles, anisidines, phenetidines, ethers of pyrocatechol, resorcinol and hydroquinone, ethers of chlorohydroquinone and chlororesorcinol, benzyl chloride and bromide, benzal chloride and bromide, benzotrichloride and benzotribromide, chlorobenzyl chloride and bromide, chlorobenzal chloride and bromide, chlorobenzotrichloride and chlorobenzotribromide, chlorofluorobenzal chloride, chloroform, carbon tetrachloride, perchloroethylene, chlorobenzene and dichlorotoluene. These organic constituents, which are designated as pollutants under the German Technical Instructions for the Control of Air Pollution (TA-Luft) of 1.3.86, must be removed from the waste gas which, in many cases, consists mainly of nitrogen which, for safety reasons, is used as a protective gas for blanketing the reaction mixture. As is clear from the diversity of the substances which have to be separated off, this purification is very difficult and technically expensive.

Physical methods are in general applied for separating harmful substances from waste gases and for recovering solvents from them. Known purification processes are adsorption, absorption, afterburning with or without catalysts, and condensation by deep-freezing. The purification can here be carried out in one stage or a plurality of stages, and can also comprise combinations of the said methods.

Adsorption processes are mainly carried out discontinuously in fixed-bed adsorbers, at least two adsorbers being erected which are alternately switched to adsorption and desorption. Admittedly, it is possible to separate the pollutants very largely from the waste gas by means of suitable adsorbents, for example activated carbon, if the waste gas which is to be purified meets the high quality requirements which allow a troublefree and constant course of the purification. Since polymerizable and sublimable substances, resin formers and dusts would block the pores of the adsorbent, they must be separated out beforehand.

The waste gas formed in the various reactions is saturated with water vapour if, for removing the inorganic constituents, for example halogen and hydrogen halide, it was washed with water or aqueous alkali or stripped with steam. Since water is also adsorbed by activated carbon, the loading capacity of the latter is reduced by a high moisture content of the waste gas. The multiplicity of the pollutants which are present in the waste gas and which greatly differ from one another in their adsorption and retention behavior. Leads to a mixed adsorption. Displacement effects can then arise. For example, chloroform and carbon tetrachloride are displaced from the adsorbent by the higher-boiling pollutants present in the waste gas, such as chlorotoluenes and chlorobenzochlorides.

The loaded adsorbents are as a rule regenerated with steam or hot air. The pollutants are thus desorbed. A high retention capacity makes the desorption more difficult, since remaining residual loading of the adsorbent leads to a reduction of the adsorption capacity, increasing with each adsorption phase, since the pollutants of high boiling point, present in the waste gas which is to be purified, can be desorbed only under drastic conditions and, in some cases, with the formation of decomposition products.

A disadvantage of activated carbons is that they contain metal ions and are therefore not inert. For example, they contain iron ions which can effect a catalytic decomposition of chloroaromatics and bromoaromatics and can react as redox agents, for example $Fe^{III}$ to $Fe^{II}$. In the presence of chlorine, activated carbon can also catalyse the formation of toxic by-products, for example phosgene.

An important problem in the purification of waste gases by adsorption also is the control of the heat of adsorption which is evolved. In the case of insufficient heat removal, activated carbon units tend to self-ignite. Generally, the heat of adsorption is about 1.5 times the heat of vaporization.

If the impurites of the waste gases are burned without catalysts, the oxidizable organic compounds are to be converted with atmospheric oxygen at temperatures of up to 900° C. into carbon dioxide and water, which are non-polluting substances. If, however, a waste gas from the side-chain halogenation or nuclear halogenation or nitration is burned, a flue gas is obtained which contains halogen or nitrogen oxides and which must still be subjected to an expensive washing process. Furthermore, there is a risk of the formation of toxic by-products in the combustion.

In catalytic afterburning, the combustion of the impurities of the waste gas takes place at about 300° to 600° C. Thus, it requires less energy. However, rare-metal catalysts cannot be used for the purification of halogenation waste gases, since the halogen compounds poison and destroy the catalyst. Special base-metal catalysts are said to have the advantage that they are not poisoned by halogen compounds. These catalysts work satisfactorily in temperature ranges between 300° C. and 600° C. In view of the fluctuations with respect to the composition and concentration of the pollutants in the waste gas mixture from the various processes, however, overheating to more than 600° C. is unavoidable. This then leads to the destruction of the catalyst and sensors.

If solvents are to be removed from waste gases by low-temperature condensation, the solvent-containing gas is cooled down to temperatures below the dew point of the solvent which is to be separated off. However, in order to reach the limit of the Clean Air Regulations, the waste gas must be cooled to very low temperatures, down to below −130° C. for chloroform and carbon tetrachloride, for example by means of liquid nitrogen. In addition, the waste gas must be pre-dried in order to avoid icing-up. This process therefore involves a high energy consumption and, if the waste gas mixtures contain a plurality of solvents, an expensive distillation.

In the purification of waste gases by absorption, a distinction must be made between chemical and physical absorption. In chemical absorption, the substance to be removed from the waste gas reacts with the wash fluid to give a compound which is non-volatile or hardly volatile. For this purpose, both the impurities of the waste gas and the wash fluid must have the appropriate reactivity. For purifying the waste gas from side-chain chlorination or bromination and nuclear chlorination or nitration, it is unsuitable.

The important factors for physical absorption are the absorption capacity, ability to be regenerated, boiling behavior, corrosion behavior, thermal stability, physiological properties, environmental behavior such as biodegradability, tendency to foam, selectivity, availability and price of the wash fluid. In practice, wash fluids such as water or organic liquids are used which react with the organic pollutants only to a negligible extent or not at all. The wash fluids must meet stringent quality requirements. The compounds washed out are concentrated in the wash fluid and can be removed from the latter, for example by distillation or steam blowing. Tray columns, packed columns and special absorption machines are used as the absorbers.

In special cases of the purification of waste gas streams, which arise in the nuclear halogenation and side-chain halogenation and nitration, the generally known wash fluids cannot be used because of the pollutants present, some of which are aggessive, and because of the changing compositions, concentrations and volumetric flow rates. It must also be expected that the waste gas contains acidic fission products arising from exothermic self-decomposition of fluorination, chlorination, bromination and nitration products. Moreover, the wash fluid must have a high stability at the relatively high temperatures required for desorption, for example of high-boiling chloronitroaromatics, and on regeneration, and must not form any toxic secondary products. Wash fluids which tend to form peroxides under these conditions, such as polyglycol ethers, may not be used.

In some chemical processes, concentrated sulphuric acid is also used as a solvent and wash fluid. However, the use of sulphuric acid is tied to specific conditions. Thus, the waste gas should not contain any pollutants which react with sulphuric acid to form solid substances, such as sulphuration products, for example toluenesulfonic acid. Moreover, disposal of the sulphuric acid loaded with halogenoaromatics raises problems. For example, for reprocessing spent sulphuric acids, the chlorine content in the form of organic or inorganic chlorine compounds must in general not exceed 1% by weight of chlorine.

The object of the present invention was therefore the separation of organic constituents, such as halogenated and nitrated substances, for example chloroaromatics, nitro-aromatics and/or chloronitroaromatics, from waste gas streams which arise in the production of aromatic intermediates and contain, for example, the abovementioned impurities and a carrier gas such as nitrogen.

The invention relates to a process for separating organic constituents from waste gases which arise in the production of aromatic intermediates, by absorption by means of wash fluids, which process comprises washing the waste gas, loaded with pollutants, with a wash fluid composed of a) paraffin hydrocarbons having 10 to 20 carbon atoms, preferably essentially 12 to 18 carbon atoms, or b) diisopropylnaphthalene or an isomer mixture of the empirical formula $C_{16}H_{20}$, a mean molecular weight of 210–215, a boiling range of 290°–300° C. (DIN 51761) and a flash point above 130° C. (DIN 51758), at temperatures from 0° to 50° C. In general, the content of the various diisopropylnaphthalenes is at least 98% by weight, the pour point is below −40° C. (DIN 51583) and the kinematic viscosity is about 6 $mm^2/s$ (at 40° C.) (DIN 51366).

The outstanding properties of diisopropylnaphthalene as an absorbent for a large number of aromatic intermediates are based on its structure. As a naphthalene derivative with branched aliphatic substituents, the compound is miscible with most of the aromatic intermediates and with many solvents; moreover, it is immiscible with water, like the paraffins. Both fluids are easy to handle, since they are virtually odourless and toxicologically acceptable. A further great advantage is easy regeneration and thermal stabiltiy. The loaded wash fluid can readily be regenerated in a simple manner by distillation, if necessary under reduced pressure.

The process according to the invention is suitable, for example, for waste gases which contain halogenoaromatics or halogenonitroaromatics, in particular chloroaromatics, nitroaromatics and chloronitroaromatics, in a quantity of, for example, 1 to 10,000 $mg/m^3$, in most cases in the range from 50 to 5,000 $mg/m^3$. The waste gas rate can vary, for example, from 10 to 2,000 $m^3/h$, preferably from 30 to 100 $m^3/h$.

The paraffin wash fluid is preferably composed essentially of n-paraffins. Advantageously, it has a melting point of at least 0° C., but it is used at a temperature at which it is liquid. The non-paraffinic content is advantageously below 5% by weight. Paraffin mixtures having an average carbon number of 15, in particular those having a viscosity of 2.2 mPa.s at 30° C., are very particularly advantageous for the washing effect.

In operation in practice, the waste gas is advantageously passed in countercurrent to the wash fluid through an absorber, in order to separate off the organic constitutents. However, other procedures are also possible, such as passing the waste gas from below through a layer of the liquid diisopropylnaphthalene or paraffin. The loaded wash fluid can be freed of the dissolved components in a desorber, for example by distillation or by reducing the pressure. The regenerated wash fluid can be recycled into the absorber, and the pollutants can be separated off by condensation and, if necessary, by additional rectification. Absorption and regeneration of the wash fluid can also be carried out discontinuously in separate steps. This process is of advantage whenever a plurality of gas streams arising separately must be purified.

Conventional devices, for example packed columns or tray columns, can be used as the absorber and desorber, and also water ring pumps which are charged with diisopropylnaphthalene or the paraffin as the operating fluid. In the absorber, the wash fluid is advantageously held at a temperature between 0° and 50° C., advantageously between 10° and 40° C. and preferably between 15° and 30° c. The desorption takes place in general under a reduced pressure at 1 to 100 mbar, preferably 10 to 50 mbar, and at a temperature of 100° to 200° C., preferably 120° to 160° C. The feed rate and circulation rate of the wash fluid into the absorber are adjusted in accordance with the impurities content of the waste gas which is to be washed.

The pollutant concentration in the waste gas is checked before and after the wash, for example by gas chromatographic analyses. From these, the degree of absorption is determined by the following equation:
Degree of absorption (%)

$$\frac{(c_x) \text{ crude gas} - (c_x) \text{ pure gas}}{(c_x) \text{ crude gas}} \times 100$$

The degree of absorption in the pure gas should be between 60 and 100%, preferably between 70 and 95%.

The examples which follow are intended to explain the subject of the invention in more detail.

EXAMPLES 1 TO 11 gas issued at the column top. The paraffin or diisopropylnaphthalene loaded with the waste gas constituents was collected at the bottom of the column in a receiver vessel (capacity 1 l) and pumped through a heat exchanger (heating temperature 120° C.) into a desorber. The desorption of the organic compounds concentrated in the paraffin or diisopropylnaphthalene was effected by distillation under a presure of 40 mbar (Examples 1 to 6) or 50 mbar (Examples 7 to 11). To separate the paraffin or diisopropylnaphthalene from the waste gas pollutants dissolved therein, a packed distillation column of 600 mm height and 30 mm diameter was used, which contained a metal fabric packing (275–29 mm Sulzer laboratory packing).

The purified paraffin or diisopropylnaphthalene was pumped back again into the particular stock vessel through a cooler.

The experimental data and results are summarized in Tables 1 and 2.

TABLE 1

Experimental data and results of the waste gas wash

| | Flow Rate | | | Degree of waste gas absorption (%) in the paraffin | | | | | | |
|---|---|---|---|---|---|---|---|---|---|---|
| Example | Waste gas (l/h) | Paraffin (l/h) | Temperature (°C.) | Chloroform | Carbon tetrachloride | Toluene | Fluorotoluene | Perchloroethylene | Chlorobenzene | Chlorotoluenes |
| 1 | 300 | 1.0 | 22 | 74.0 | 92.3 | 94.4 | 92.3 | 97.8 | 100.0 | 95.1 |
| 2 | 400 | 3.2 | 34 | 80.0 | 92.8 | 92.3 | 90.7 | 100.0 | 94.1 | 98.7 |
| 3 | 400 | 1.0 | 23 | 69.4 | 81.1 | 90.0 | 91.4 | 94.7 | 90.1 | 91.3 |
| 4 | 600 | 1.0 | 22 | 66.7 | 91.1 | 87.5 | 86.6 | 91.7 | 87.3 | 90.0 |
| 5 | 800 | 1.0 | 23 | 65.3 | 85.8 | 86.7 | 83.4 | 90.0 | 79.5 | 81.2 |
| 6 | 1,000 | 1.0 | 23 | 63.0 | 73.9 | 76.0 | 84.1 | 85.7 | 69.4 | 66.3 |

Degree of absorption (%) = $\frac{(c_x) \text{ crude gas} - (c_x) \text{ pure gas}}{(c_x) \text{ crude gas}} \times 100$

TABLE 2

Experimental data and results of the waste gas wash

| | Flow Rate | | | Degree of waste gas absorption (%) in diisopropylnaphthalene | | | |
|---|---|---|---|---|---|---|---|
| Example | Waste gas (l/h) | Diisopropylnaphthalene (l/h) | Temperature (°C.) | Chlorotoluenes | Dichlorobenzenes | Nitrotoluenes | Chloronitrobenzenes |
| 7 | 175 | 1.2 | 16 | 100 | 100 | 100 | 100 |
| 8 | 280 | 1.2 | 18 | 99.9 | 99.9 | 100 | 100 |
| 9 | 400 | 1.3 | 21 | 99.1 | 95.1 | 93.4 | 96.2 |
| 10 | 550 | 4.5 | 26 | 98.2 | 93.5 | 87.6 | 85.2 |
| 11 | 600 | 1.2 | 20 | 93.4 | 89.3 | 76.8 | 67.8 |

Degree of absorption (%) = $\frac{(c_x) \text{ crude gas} - (c_x) \text{ pure gas}}{(c_x) \text{ crude gas}} \times 100$ A waste gas, arising in the side-chain chlorination of methylaromatics (Examples 1 to 6) and in the production of chloronitroaromatics (Examples 7 to 11), was purified continuously in a glass apparatus under various conditions, as follows:

1 to 8 l/h of n-paraffin having 12 to 18 carbon atoms and cooled to 16° to 26° C. (Examples 1 to 6) or 1.2 to 4.5 l/h of diisopropylnaphthalene cooled to 16° to 26° C. (Examples 7 to 11) were allowed to run out of a wash fluid buffer vessel (capacity 2,000 ml) from above into an absorber in such a way that the paraffin or diisopropylnaphthalene was at the temperatures indicated in Tables 1 and 2. The absorber consisted of a vertically arranged wash column packed with Raschig rings (height 500 mm; diameter 30 mm; diameter of the Raschig rings 6 mm; weight of packing 118 g). The waste gs loaded with organic constituents was drawn in countercurrent to the wash fluid at a flow rate of 300 to 1,000 l/h (Examples 1 to 6) or 17.5 to 550 l/h (Examples 7 to 11) through the absorption column. The purified waste

We claim:

1. A process for the separation of undesired organic ingredients comprising chloroform, carbon tetrachloride, perchloroethylene, and haloaromatics from waste gases which are formed in the preparation of halogenated aromatic intermediates and contain said compounds and mixtures of any of said compounds with unreacted aromatic starting materials, which comprises washing the waste gases with a washing liquid comprising
  (a) paraffinic hydrocarbons having from 10 to 20 carbon atoms or
  (b) diisopropylnaphthalene or a mixture of isomers thereof having the sum formula $C_{16}H_{20}$, an average molecular weight in the range of from 210 to 215, a boiling range in the range of from 290° to 300° C. and a flash point above 130° C.

at a temperature in the range of from 0° to 50° C., but above the melting point of the washing liquid to remove the said undesired organic ingredients.

2. A process as claimed in claim 1, wherein the paraffinic hydrocarbon washing liquid has a melting point of at least 0° C., but is applied at a temperature above the melting point.

3. A process as claimed in claim 1, wherein the paraffinic hydrocarbons have a viscosity of 2.2 mPa.s at 30° C.

4. A process as claimed in claim 1, wherein the paraffinic hydrocarbon washing liquid consists substantially of n-paraffins.

5. A process as claimed in claim 1, wherein the nonparaffinic portion in the paraffinic hydrocarbon washing liquid is below 5% by weight.

6. A process as claimed in claim 1, wherein the diisopropylnaphthalene or the mixture of isomers thereof has a kinematic viscosity of at most about 6 mm$^2$/s at 40° C.

7. A process as claimed in claim 1, wherein the absorbed compounds are desorbed from the washing liquid at a temperature in the range of from 100° to 200° C.

8. A process as claimed in claim 7, wherein the temperature is in the range of from 120° to 160° C.

9. A process as claimed in claim 1, wherein the paraffinic hydrocarbons have substantially from 12 to 18 carbon atoms.

10. A process as claimed in claim 9, wherein the paraffinic hydrocarbons have 15 carbon atoms on average.

11. A process as claimed in claim 1, wherein the content of the various diisopropylnaphthalenes is at least 98% by weight.

12. A process as claimed in claim 11, wherein the setting point of the diisopropylnaphthalene washing liquid is below −40° C.

13. A process as claimed in claim 1, wherein the temperature of the washing liquid during the absorption process is in the range of from 10° to 40° C.

14. A process as claimed in claim 13, wherein the temperature is in the range of from 15° to 30° C.

15. A process as claimed in claim 1, wherein the waste gas contains halogen aromatic compounds or halogen nitro aromatic compounds in an amount of up to 10,000 mg/m$^3$.

16. A process as claimed in claim 15, wherein the amount is in the range of from 50 to 5,000 mg/m$^3$.

17. A process as claimed in claim 1, wherein the absorbed compounds are desorbed from the washing liquid at a pressure in the range of from 1 to 100 mbar.

18. A process as claimed in claim 17, wherein the pressure is in the range of from 10 to 50 mbar.

19. A process as claimed in claim 17, wherein the absorbed compounds are desorbed from the washing liquid at a temperature in the range of from 100° to 200° C.

20. A process for the separation of undesired organic ingredients comprising chloroform, carbon tetrachloride, perchloroethylene, and haloaromatics from waste gases which are formed in the preparation of halogenated aromatic intermediates and contain said compounds and mixtures thereof with unreacted aromatic starting materials, which comprises washing the waste gases with a washing liquid comprising
   (a) paraffinic hydrocarbons havng from 10 to 20 carbon atoms or
   (b) diisopropylnaphthalene or a mixture of isomers thereof having the sum formula $C_{16}H_{20}$, an average molecular weight in the range of from 210 to 215, a boiling range in the range of from 290° to 300° C. and a flash point above 130° C.
   at a temperature in the range of from 0° to 50° C., but above the melting point of the washing liquid to remove the said undesired organic ingredients.

21. A process for the separation of undesired organic ingredients comprising chloroform, carbon tetrachloride, perchloroethylene, and haloaromatics from waste gases which are formed in the preparation of halogenated aromatic intermediates and contain said compounds and mixtures of any of said compounds with unreacted aromatic starting materials, which comprises washing the waste gases with a washing liquid comprising paraffinic hydrocarbons having from 10 to 20 carbon atoms at a temperature in the range of from 0° to 50° C., but above the melting point of the washing liquid to remove the said undesired organic ingredients.

22. A process for the separation of undesired organic ingredients comprising chloroform, carbon tetrachloride, perchloroethylene, and haloaromatics from waste gases which are formed in the preparation of halogenated aromatic intermediates and contain combinations thereof with one or more of decomposition products formed and from unreacted starting materials which comprises washing the waste gases with a washing liquid comprising paraffinic hydrocarbons having from 10 to 20 carbon atoms at a temperature in the range of from 0° to 50° C., but above the melting point of the washing liquid to remove the said undesired organic ingredients.

* * * * *